United States Patent [19]
Griffin

[11] Patent Number: 5,575,833
[45] Date of Patent: Nov. 19, 1996

[54] REFRIGERANT RECYCLING SYSTEM AND APPARATUS

[75] Inventor: Gary E. Griffin, Penn Yan, N.Y.

[73] Assignee: Parker-Hannifin Corporation, Cleveland, Ohio

[21] Appl. No.: 270,206

[22] Filed: Jul. 1, 1994

Related U.S. Application Data

[63] Continuation-in-part of Ser. No. 951,687, Sep. 25, 1992, abandoned.

[51] Int. Cl.$^6$ .................................................. B01D 53/02
[52] U.S. Cl. ........................... 95/117; 55/280; 55/394; 55/428; 55/466; 62/475; 62/503; 210/90; 210/167; 210/168; 210/195.1; 210/248; 210/502.1; 210/443; 210/446; 210/266; 210/282; 210/DIG. 6
[58] Field of Search ............................ 210/85, 90, 167, 210/168, 188, 248, 266, 282, 283, 284, 194, 443, 446, 195.1, 323.1, 502.1, DIG. 6, DIG. 7; 96/51, 108; 62/503, 474, 475; 95/117; 55/280, 394, 428, 466

[56] References Cited

U.S. PATENT DOCUMENTS

| | | | |
|---|---|---|---|
| 2,758,719 | 8/1956 | Line | 210/443 |
| 3,250,397 | 5/1966 | Moltchan | 210/443 |
| 3,319,791 | 5/1967 | Horne | 210/443 |
| 3,545,227 | 12/1970 | Grahl | 62/474 |
| 3,572,050 | 3/1971 | Bottum . | |
| 3,618,771 | 11/1971 | Akers . | |
| 3,759,062 | 9/1973 | Wrenn et al. | 62/474 |
| 3,785,164 | 1/1974 | Wrenn . | |
| 3,808,827 | 5/1974 | Joseph et al. . | |
| 3,859,216 | 1/1975 | Sisson et al. . | |
| 4,080,170 | 3/1978 | Borkenstein . | |
| 4,109,487 | 8/1978 | Carr . | |
| 4,255,940 | 3/1981 | Grahl et al. | 62/474 |
| 4,436,623 | 3/1984 | Cullen | 210/DIG. 6 |
| 4,504,289 | 3/1985 | Waller . | |
| 4,584,624 | 10/1985 | Waller . | |
| 4,646,527 | 3/1987 | Taylor | 62/85 |
| 4,756,166 | 7/1988 | Tomasov | 62/474 |
| 5,038,582 | 8/1991 | Takamatsu | 62/474 |
| 5,089,119 | 2/1992 | Day et al. . | |
| 5,094,087 | 5/1992 | Gramkow | 62/292 |
| 5,104,537 | 4/1992 | Stifelman et al. . | |
| 5,133,787 | 4/1992 | Diot et al. . | |
| 5,179,780 | 1/1993 | Douglas et al. . | |
| 5,215,660 | 6/1993 | Mosher et al. | 210/DIG. 7 |

OTHER PUBLICATIONS

Hawley's Condensed Chemical dictionary 11th edition, 1987 pp. 792–793.

Primary Examiner—Robert J. Popovics
Attorney, Agent, or Firm—Christopher H. Hunter

[57] ABSTRACT

A refrigerant recycling system (10) has a compressor (12) and identical first and second drier/separators (18, 20). Refrigerant material to be reclaimed is drawn into an inlet (22) of the first drier/separator, in which lubricant is separated from refrigerant vapor. After the lubricant is removed, the refrigerant vapor is filtered as it passes through a screen (80), a bed of molecular sieve material (82), and a fibrous pad (84). After passing through the first drier/separator, the refrigerant enters the compressor in which clean lubricant material is introduced to enable the compressor to operate effectively. From the compressor, the refrigerant vapor and clean lubricant passes through the second drier/separator wherein the clean lubricant is removed and the refrigerant vapor is again filtered. The twice filtered vapor is then passed to a condenser (44) in which it is condensed to a liquid. The clean refrigerant liquid is delivered from the reclamation system cleansed of impurities.

35 Claims, 7 Drawing Sheets

REFRIGERANT RECYCLING SYSTEM AND APPARATUS

RELATED CASE

This is a continuation-in-part application of Griffin, U.S. Ser. No. 07/951,687, filed Sep. 25, 1992, now abandoned, for "Refrigerant Recycling System."

TECHNICAL FIELD

This invention relates to systems and apparatus that are used to recover and recycle refrigerant material from devices such as air conditioners and refrigerators. Specifically, this invention relates to systems and apparatus that filter and purify recovered refrigerant so that it may be reused.

BACKGROUND ART

Chloroflorocarbons (CFCs) are commonly used as refrigerants in heating and cooling systems. For years, CFCS have been found in most air conditioning systems, heat pumps and refrigerators.

In recent years, CFCs have been identified as a cause of damage to the earth's ozone layer. To prevent further damage, governments have enacted legislation which restricts the release of CFCs into the atmosphere.

CFCs, when used in heat transfer systems, may become contaminated with impurities such as water, and dirt and metal particles. Such impurities cause the formation of destructive acid compounds and reduce the efficiency of the system. When the refrigerant material is contaminated, it must be replaced with suitable material if the system is to continue to operate.

In most systems, the CFC refrigerant material is moved through the system along with a lubricant material. This lubricant, which is sometimes referred to as compressor oil, enters the refrigerant stream in the compressor which is used to compress the refrigerant vapor. When the refrigerant becomes contaminated, the lubricant also becomes contaminated necessitating its removal as well.

Many prior art systems have been developed for capturing and recycling refrigerant materials. These systems typically include a means for attaching the recycling system to the system from which the refrigerant is to be removed. The recycling system also has a pump or compressor device for drawing the refrigerant from the system in which it has been used.

Refrigerant recycling systems also typically include an oil separator on the upstream side of the recycling system's compressor. The oil separator serves to separate the contaminated lubricant from the contaminated refrigerant vapor. The contaminated oil is drained from the oil separator for further process and recycling.

Positioned in a conventional recycling system between the oil separator and the compressor, is a separate acid filter assembly. The acid filter assembly neutralizes and removes corrosive acids from the refrigerant vapor before the refrigerant enters the compressor.

The compressors used in most prior art recycling systems require lubricant for their operation. New clean lubricant must be added to the compressor of the recycling system. In operation, a portion of this lubricant becomes mixed with the refrigerant being recycled, and must be removed.

In the recycling system, refrigerant vapor is compressed by the compressor and moves downstream in the recycling system at a higher pressure. The refrigerant material on the downstream side first passes through another oil separator device. This second oil separator removes the clean lubricant that was added at the compressor. The clean lubricant that is separated, is typically returned to the compressor of the recycling system.

After passing through the oil separator on the downstream side, the refrigerant vapor is then passed through a condenser. The refrigerant material loses heat in the condenser and condenses to a liquid. Once the refrigerant is liquified, the refrigerant is typically passed through a particulate and contaminant filter/drier assembly. This assembly removes the contaminants and particles that were not removed on the upstream side, and removes moisture from the refrigerant liquid. It is then stored in a vessel or tank for return to the system from which it was originally taken, or is stored for later use as replacement material in another system.

The problem with conventional prior art reclamation systems is that they require a separate oil separator on both the upstream and downstream sides of the compressor. Further, these systems require a multitude of particulate and chemical filters. This adds to the cost and complexity of the system. It also requires people who operate such systems to maintain a supply of replacement filters and elements of various sizes and styles so that the system may continue to be operated when one or more of the filters becomes contaminated. The oil separators are also subject to failure due to contaminant build up and acid attack.

Thus, there exists a need for a refrigerant recycling system and apparatus that is effective and is less expensive to produce and operate.

DISCLOSURE OF INVENTION

It is an object of the present invention to provide a refrigerant recycling system and apparatus that is economical to manufacture.

It is a further object of the present invention to provide a refrigerant recycling system and apparatus that is effective in filtering and recycling refrigerant material.

It is a further object of the present invention to provide a refrigerant recycling system that has a small number of components.

It is a further object of the present invention to provide a refrigerant recycling system that includes a vapor drier/separator that accomplishes lubricant separation, dehydration and filtration within a single housing.

Further objects of the present invention will be made apparent in the Best Mode for Carrying Out Invention and the appended claims.

The foregoing objects are accomplished in the preferred embodiment of the invention by a refrigerant recycling system that has an inlet for connecting the recycling system to a heat transfer system from which the refrigerant material and lubricant are to be recycled. The recycling system has a compressor with a suction inlet line. The suction inlet line of the compressor of the recycling system is in fluid communication with the system inlet. Positioned between the compressor suction line and the system inlet is a first vapor drier/separator.

The recycling system further comprises a discharge line from the compressor. The discharge line is in fluid communication with a condenser for condensing refrigerant vapor to a liquid. The condenser is further connected to an outlet which enables the liquid refrigerant to be deposited in a vessel or other location where it can be reused.

Positioned in the system between the compressor discharge line and the condenser is a second vapor drier/ separator. In a preferred embodiment, the first and second vapor drier/separators are identical. Each vapor drier/separator has a body that encloses a chamber. An inlet is connected to a conduit inside of the chamber that directs the incoming refrigerant and lubricant to a lower position of the chamber. The lubricant is separated from the refrigerant in the lower portion of each vapor drier/separator through quiescent separation. The lubricant is drained off for further processing in the case of the first vapor drier/separator and is returned to the compressor of the reclamation system in the case of the second vapor drier/separator.

Vaporized refrigerant flows upward from the lower portion of the vapor drier/separator and passes through a fine screen. The fine screen provides particulate filtration and further insures the separation of the lubricant from the refrigerant vapor.

The refrigerant material passes further upward inside the chamber above the screen. The refrigerant vapor passes through a bed of molecular sieve material which removes moisture, acids and other impurities. Above the bed of molecular sieve, the refrigerant vapor passes through a fibrous filter pad. The filter pad provides fine particulate filtration and also serves to retain the particles of molecular sieve in the bed.

Vertically above the filter pad, the refrigerant vapor passes into an upper stream of the chamber. The vapor then leaves the body of the vapor drier/separator free of lubricant and contaminants, through an outlet.

The refrigerant recycling system and apparatus of the present invention provides advantages because it accomplishes oil separation, dehydration and filtration in a single body. In addition, the system and apparatus provides excellent filtration because the reclaimed refrigerant is fully filtered on both the upstream and downstream sides of the compressor.

BEST MODES FOR CARRYING OUT INVENTION

Figure 1:
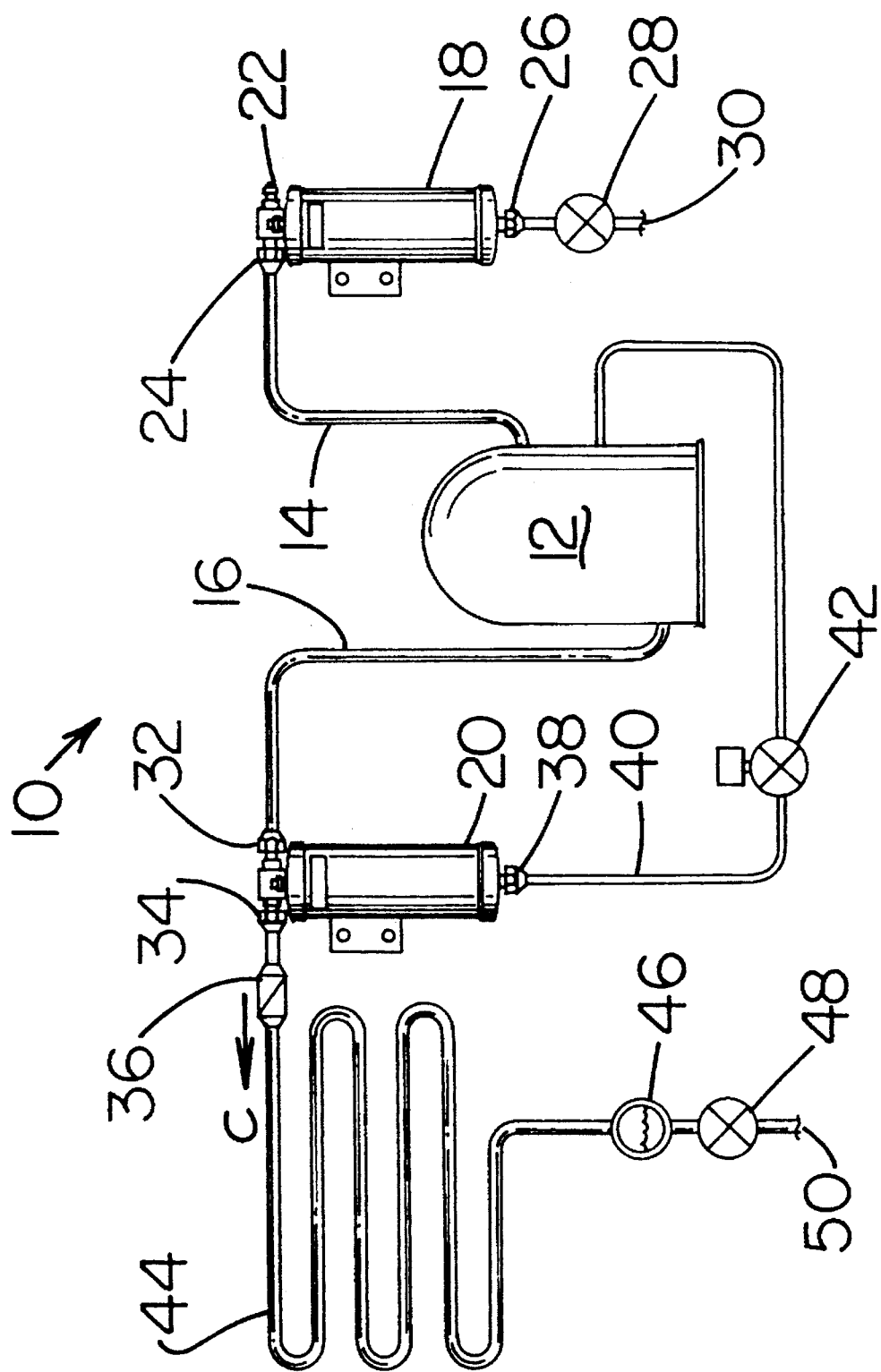
FIG. 1 is a schematic view of the refrigerant recycling system of the present invention.

Referring now to the drawings and particularly to FIG. 1, there is shown therein the preferred embodiment of the refrigerant recycling system of the present invention generally indicated 10. The system has a vapor compressor 12 which is connected to a suction line 14 and a discharge line 16.

The system further includes a first vapor drier/separator 18 and a second vapor drier/separator 20. First drier/separator 18 has a first D/S inlet 22 which is adapted for connection to a hose or other conduit that connects the recycling system 10 to the system from which refrigerant is to be recycled. First drier/separator 18 also has a first D/S outlet 24 that is in communication with suction line 14. First drier/separator 18 also has a first drain outlet 26 which is connected to a first oil outlet valve 28. Outlet valve 28 is connected to an outlet 30.

Second drier/separator 20 has a second D/S inlet 32 that is in connection with discharge line 16. A second D/S outlet 34 of second drier/separator 20 is in communication with a check valve 36 which enables flow only in the direction of arrow C.

Second drier/separator 20 also has a second drain outlet 38. Second drain outlet 38 is in communication with a clean oil return line 40 which extends to compressor 12. A solenoid valve 42 is mounted in, and serves to control flow through, return line 40.

Check valve 36 is in fluid communication with a condenser shown schematically as 44. Condenser 44 includes a moisture indicator 46 for indicating the presence of water in the refrigerant. In the preferred form of the invention, indicator 46 is a visual indicator of the sight glass type that includes a cobalt bromide treated paper in the refrigerant path. This sight glass type moisture sensor gives a visual indication of moisture content through an observable change in color.

The condenser 44 is connected to an outlet valve 48 which is connected to an outlet 50. Outlet 50 may be connected to a vessel or other container for holding refrigerant material. In other embodiments, the outlet could lead directly back to the heat transfer system.

In the preferred embodiment of the refrigeration recycling system 10, the first and second drier/separators 18 and 20 are identical. Therefore, only first drier/separator 18 is described in detail herein.

Drier/separator 18 is shown in greater detail in FIGS. 2–5. Drier/separator 18 has a first body 52 which encloses a first chamber 54. Body 52 has a central cylindrical portion 56 with upper and lower end caps 58 and 60 respectively, which are welded to the central portion for ease of assembly. The central portion 56 includes bracket 62 which facilitates mounting the drier/separator to a structure which houses the recycling system (not shown).

A fitting block 64 extends on the upper end 58 of the drier/separator. The fitting block 64 includes first D/S inlet 22 and first D/S outlet 24. First D/S inlet 22 is in fluid communication through fitting block 64 with an inlet tube 66.

Inlet tube 66 has a widened nozzle portion 68 at its lower end. Inlet tube 66 serves as a first inlet conduit means for conducting refrigerant and lubricant from D/S inlet 22 to a lower portion 70 of chamber 54.

Figure 2A:
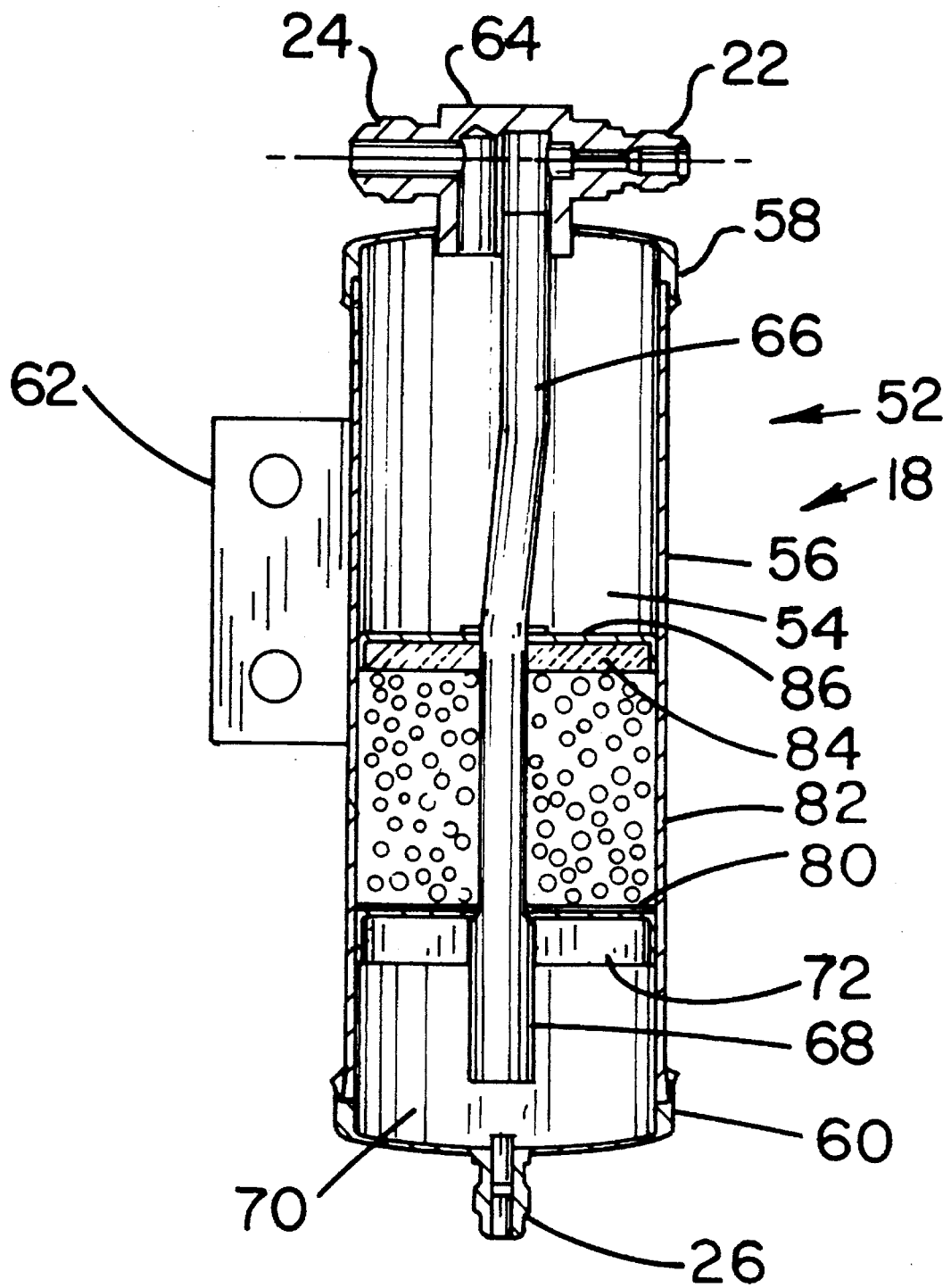
FIG. 2A is a cross-sectional view of one form of a vapor drier/separator of the recycling system.
Figure 5:
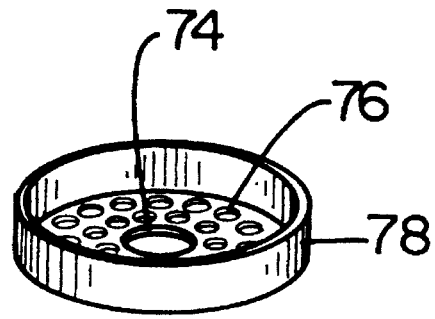
FIG. 5 is a isometric view of a perforated compression plate of the vapor drier/separator.
Figure 4:
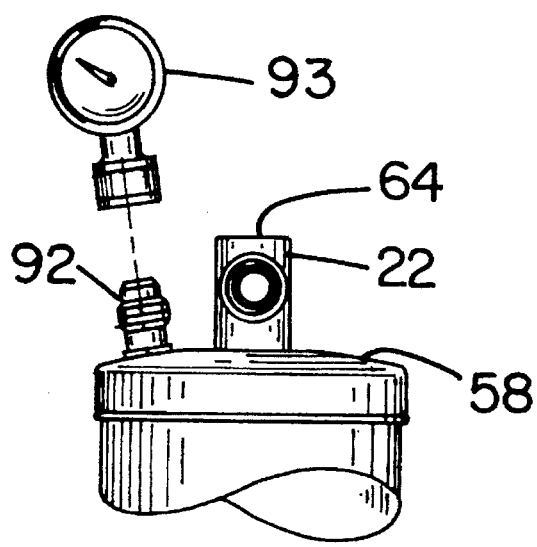
FIG. 4 is a partial side view of the top portion of the vapor drier/separator.

According to one form of the vapor drier/separator illustration in FIG. 2A, a first perforated plate 72 is positioned inside chamber 54. As shown in FIG. 5, plate 72 has a central opening 74 as well as a plurality of smaller openings 76 therethrough. Perforated plate 72 has a circumferential lip 78. A central opening 74 of plate 72 is sized to fit closely about inlet tube 66 so that the outside wall of nozzle area 68 serves as a positive stop. This circumferential lip 78 of plate 72 is sized to be in close fitting relation with the inside wall of central cylindrical portion 56 of the body.

Figure 2B:
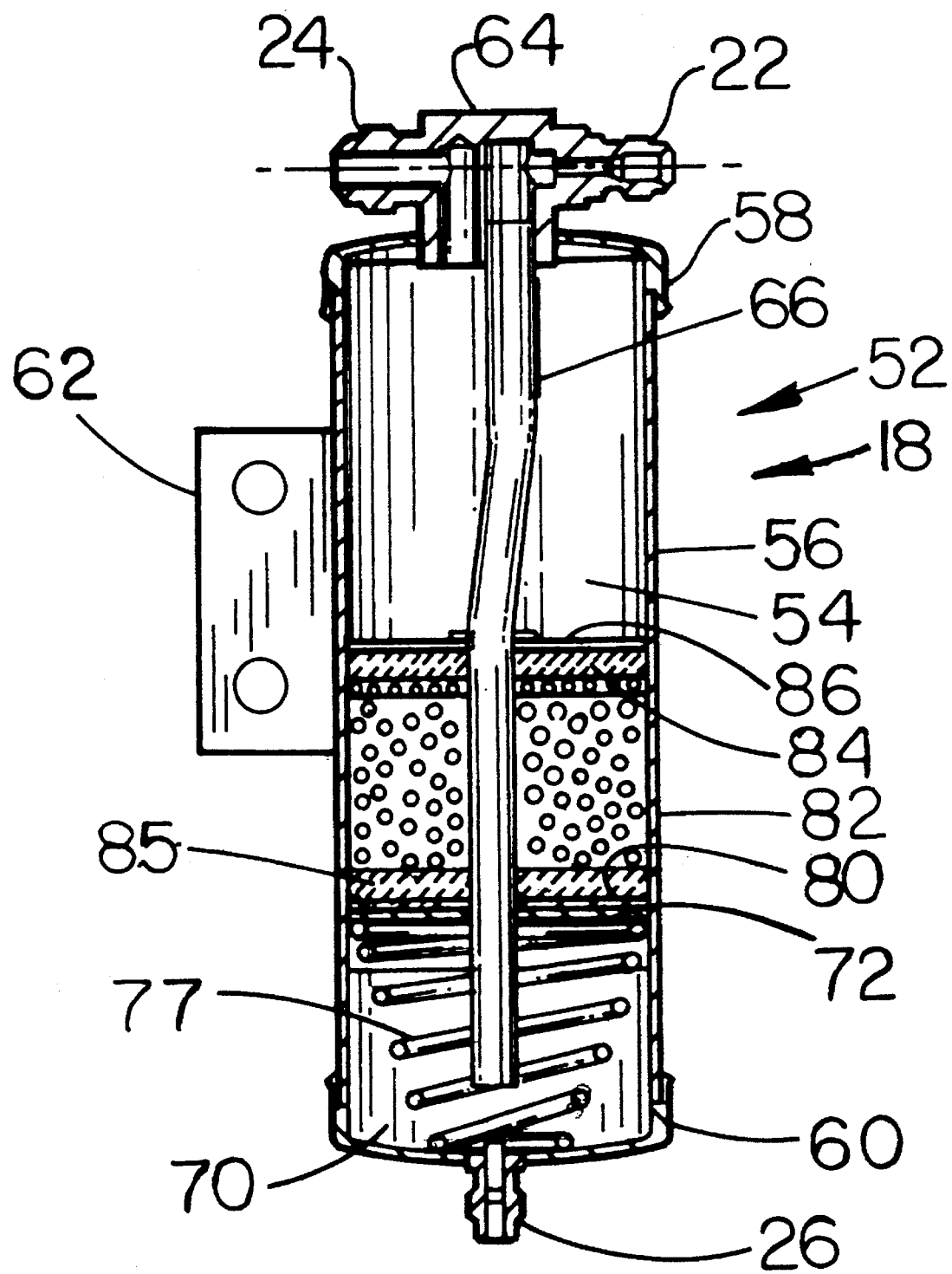
FIG. 2B is a cross-sectional view of another form of a vapor drier/separator of the recycling system.
Figure 3:
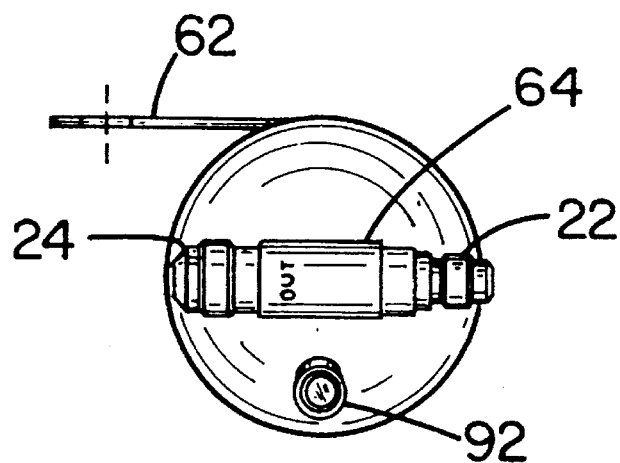
FIG. 3 is a top view of the vapor drier/separator shown in FIG. 2.

According to another form of the vapor drier/separator illustrated in FIG. 2B, perforated plate 72 can be formed in the same manner as described above with respect to FIG. 2A, but without circumferential lip 78. In this form, the diameter of the plate is slightly smaller than the inside wall of central cylindrical portion 56 of the body. The inlet tube 66 can also be formed within a constant diameter along its length. To retain the perforated plate 72 within the body, a compression spring 77 is received around inlet tube 66 and extends between lower end cap 60 and perforated plate 72.

Referring now to FIGS. 2A or 2B, a fine circular screen 80 is next positioned above and in supporting contact with circular plate 72. A bed of molecular sieve material 82 is positioned above fine screen 80. In the preferred form of the invention, the molecular sieve is type 4AXH-9, available from the U.O.P. Company. The particles of molecular sieve are sized so that they cannot pass downwards through screen 80.

A pad 84 of fibrous material is positioned above bed 82. Pad 84 is made of low density fiberglass material. A similar fibrous pad 85 (FIG. 2B) can also be located between plate 72 and molecular sieve material 82. A second perforated plate 86 is positioned above pad 84. Second perforated plate 84 is similar to first perforated plate 72, and includes a circumferential lip (not numbered).

A sliding spring lock 88 is positioned around tube 66 and in abutting contact with second perforated plate 86. Spring lock 88 is movable in the downward direction on tube 66, but resists movement upward. Spring lock 88 serves to compress the pad 84 in bed 82. This is accomplished by of pressing the spring lock downward during assembly after the pad and bed are installed.

First chamber 54 of drier/separator 18 includes an upper area 90. Upper area 90 is in fluid communication with first D/S outlet 24.

A gage port 92 extends through upper end cap 58. Gage port 92 is typically used to connect the interior of the drier/separator to a pressure gage, pressure switch and/or a non-condensable gas vent.

In operation of the refrigerant recycling system 10, refrigerant to be recycled along with entrained lubricant are shown by suction into first D/S inlet 22 of first drier/separator 18. The refrigerant and lubricant are drawn downward in inlet tube 66. As the flowing refrigerant and lubricant reaches nozzle area 68, its velocity slows. The speed further slows as the material enters lower portion 70. The quiescent condition of the material in lower portion 70 serves as separation means to separate the lubricant from the refrigerant. The lubricant settles in the bottom of lower portion 70 and is periodically drawn out through valve 28. The contaminated lubricant drawn out through valve 28 is housed in a vessel (not shown) and is later processed further so that it may be reused or disposed of by appropriate means.

The lubricant free refrigerant vapor travels upward from the lower portion of the chamber 54. It passes through the perforations 76 in plate 72, and through screen 80. Passage of the refrigerant through screen 80 serves to filter out large particulates that may be present, and also completes the separation of any remaining entrained lubricant material.

Once the refrigerant material is past screen 80, the refrigerant passed upward through bed 82 of molecular sieve. Passage through the molecular sieve particles serves to remove water and other contaminants. Above bed 82 the refrigerant passes through pad 84 which provides further particulate filtration. In addition, pad 84 prevents particles of molecular sieve from passing upward, out of the bed.

After passing through pad 84 of the refrigerant vapor passes through the perforations in the second perforated plate 86 and travels into upper area 90. The quiescent condition in upper area 90 provides final separation. From upper area 90 the refrigerant vapor passes out first D/S outlet 24 and into suction line 14.

The refrigerant vapor that has been filtered by first drier/separator 18 is drawn through suction line 14 to compressor 12. In compressor 12 the refrigerant vapor is compressed and mixed with clean lubricant which is delivered in return line 40. The refrigerant is then pumped through compressor discharge line 16 into the second drier/separator inlet 32 of second drier/separator 20.

Refrigerant is separated from the clean lubricant entrained with refrigerant in second drier/separator 20. The separation process is the same as the separation of the contaminated lubricant in the first drier/separator 18. The separated clean lubricant is passed out second drain outlet 38 and returned to the compressor through return line 40. Solenoid valve 42 is used to control the flow of lubricant back to the compressor. In other embodiments other types of valves, including manual valves, may be used.

Refrigerant material passing through second drier/separator 20 is filtered by a screen, bed of molecular sieve and pad similar to those in the first drier/separator, all of which serve as filtration means for removing contaminants. The now twice filtered refrigerant is delivered from the second drier/separator through second D/S outlet 34.

From second D/S outlet 34 the refrigerant passes through check valve 36, which operates to insure one-way flow into the condenser 44. The refrigerant vapor loses heat as it passes through the condenser and condenses to a liquid. The liquid is delivered to the outlet 50 which is typically connected to a vessel or a tank in which the reclaimed refrigerant may be stored.

Moisture sensor 46 is used to provide a visual check to insure that the drier/separators are removing the harmful water and other contamination from the refrigerant. Gage ports 92 may also be connected to pressure gauges 93 (see FIG. 4) which show whether the filter means in the drier/separators are blocked by contaminants. Specifically, a less than normal pressure at a gage port (higher vacuum on suction side) indicates a need to replace the associated drier/separator. Also, air and other light noncondensible gases that accumulate in upper chamber 90, may be vented through a valve attached to gage port 92.

The refrigerant recycling system of the present invention provides advantages because the dehydration, lubricant separation and filtration of the refrigerant are effectively accomplished in a single unit. Further, the system achieves double filtration of the reclaimed refrigerant. The identical nature of the separator/drier devices on each side of the compressor provides for ready maintenance and reduces the number of types of replacement items that the operator of the reclamation system must keep on hand.

Figure 6:
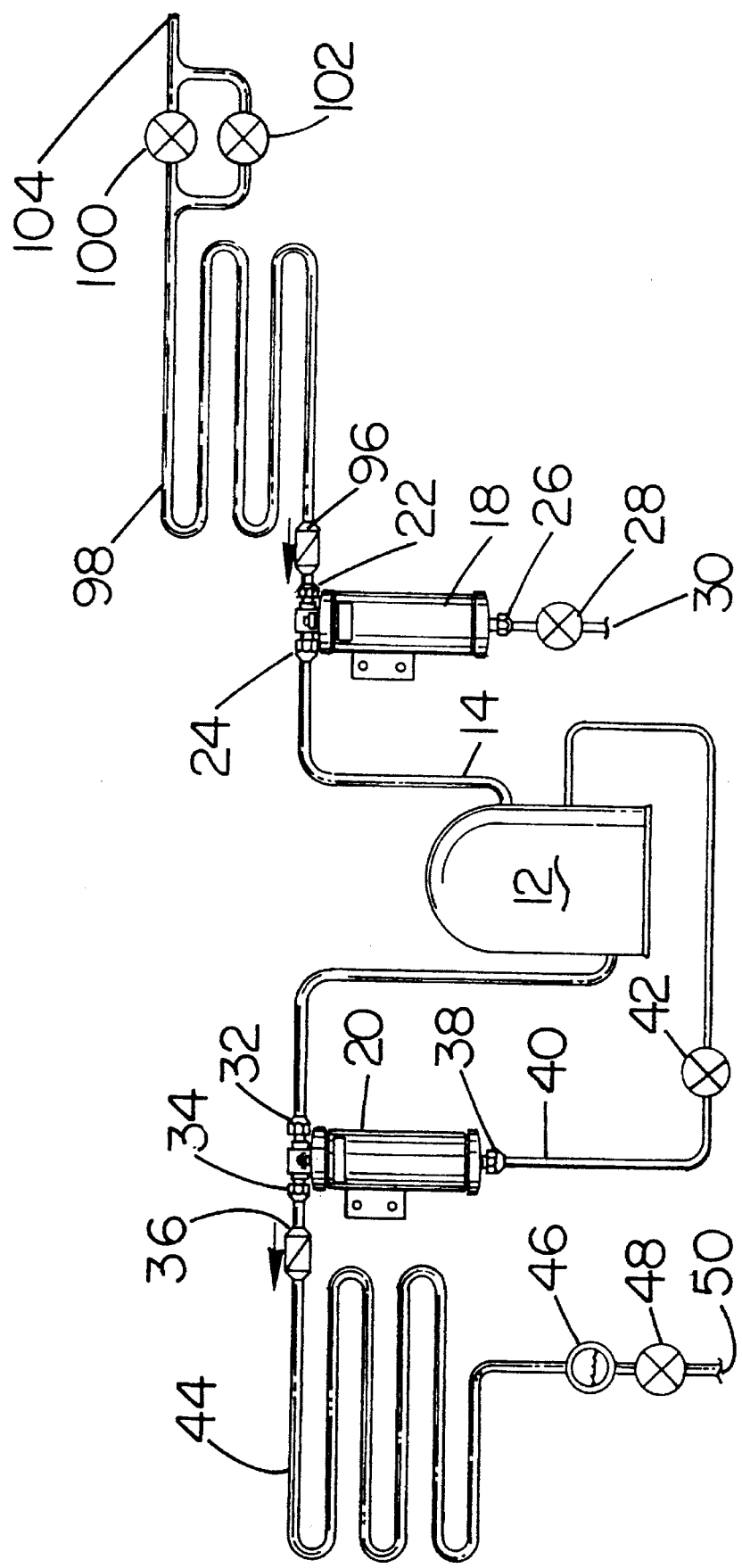
FIG. 6 is a first alternative embodiment of the recycling system of the present invention that includes a vaporizing heat exchanger in the flow path before the first vapor drier/separator.

An alternative embodiment of the recycling system of the present invention is shown in FIG. 6. The system shown in FIG. 6 is identical to the system shown in FIG. 1 except as noted herein.

The alternative system includes a check valve 96 connected to first D/S inlet 22. Check valve 96 enables flow only into first drier/separator 18. Check valve 96 is in fluid communication with the outlet of an evaporator 98. Evaporator 98 is in fluid connection with a by-pass valve 100. By-pass valve 100 is connected in series with a metering device 102, such as an expansion valve or orifice. An inlet line 104 is used to connect the by-pass valve 100 and metering device 102 to the system from which the refrigerant is to be recycled.

In operation of the alternative embodiment of the system shown in FIG. 6, liquid or vaporized refrigerant may be drawn through inlet line 104 into the recycling system. When liquid is being drawn into line 104, by-pass valve 100 is closed so the refrigerant to be recycled must pass through metering device 102 which serves as expansion means. The refrigerant then passes into evaporator 98 where it absorbs heat to insure vaporization. Once it is assured that no more liquid will be drawn into the recycling system, by-pass valve 100 can be opened to more effectively draw the remaining vapor.

This alternative embodiment enables drawing liquid refrigerant material into the recycling system and avoid flooding (and reducing the effectiveness) of first drier/separator 18. It also enables more rapid recovery of refrigerant.

Figure 7:
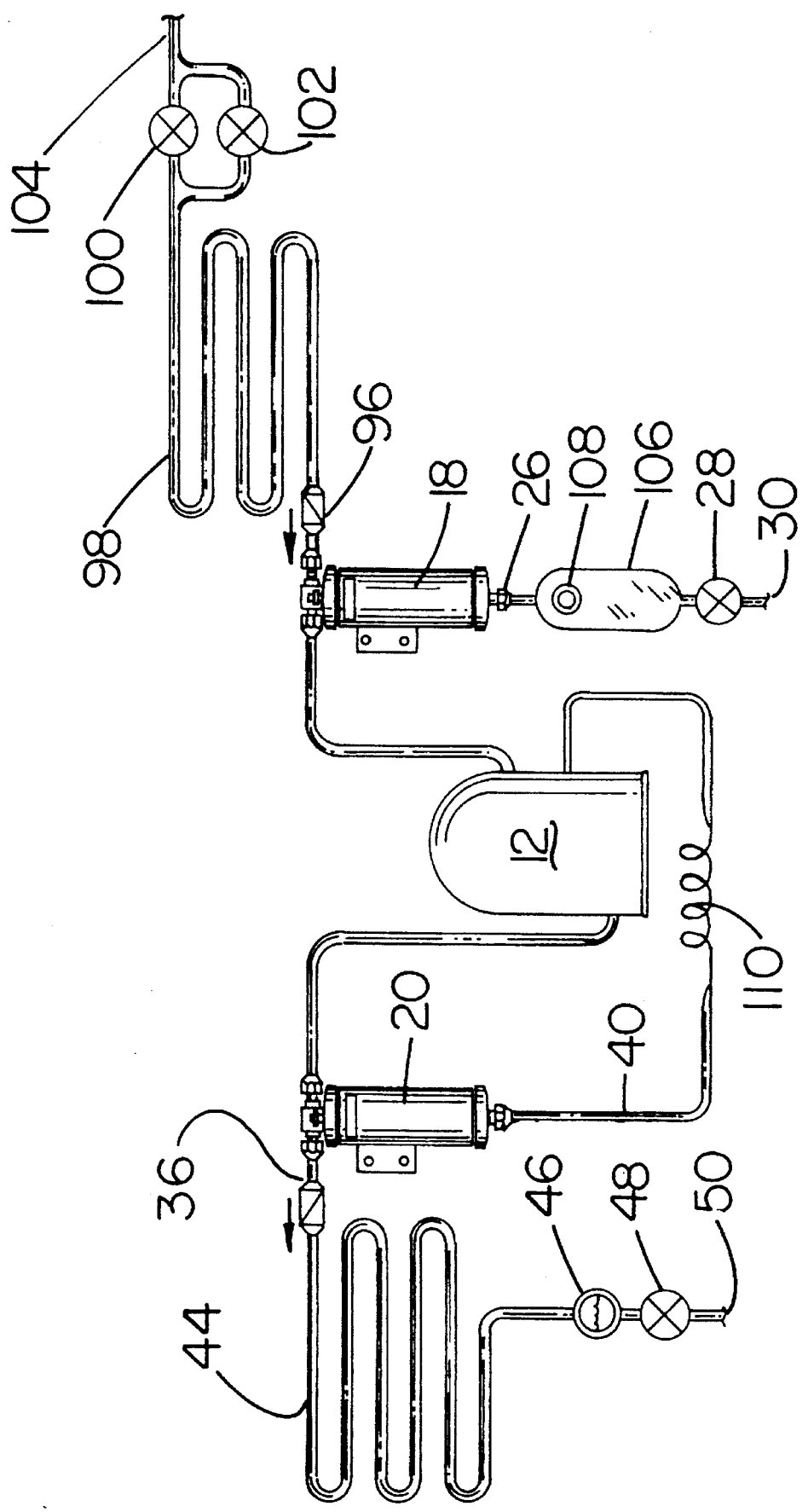
FIG. 7 is a second alternative embodiment of the recycling system of the present invention.

A further embodiment of the recycling system of the present invention is shown in FIG. 7. The system shown in FIG. 7 is identical to the system shown in Figure 6 except as noted.

The system shown in FIG. 7 further includes a collection vessel 106 attached to first drain outlet 26. Collection vessel 106 includes a sight glass or other liquid sensor 108, the enables determining the level of oil in vessel 106. Vessel 106 enables operating the recycling system for longer periods of time without having to operate oil outlet valve 28.

The system shown in FIG. 7 also includes an oil return capillary tube 110 in place of solenoid valve 42. Capillary tube 110 provides a continuous flow of clean oil to compressor 12, while limiting the amount of refrigerant vapor flow with the oil to an acceptably low flow rate. The refrigerant vapor flow through the capillary tube also provides a desirable cooling effect on the compressor motor. When the compressor is stopped, check valve 36 prevents refrigerant remaining in condenser 44 from flowing through capillary tube 110 to the compressor.

Figure 8:
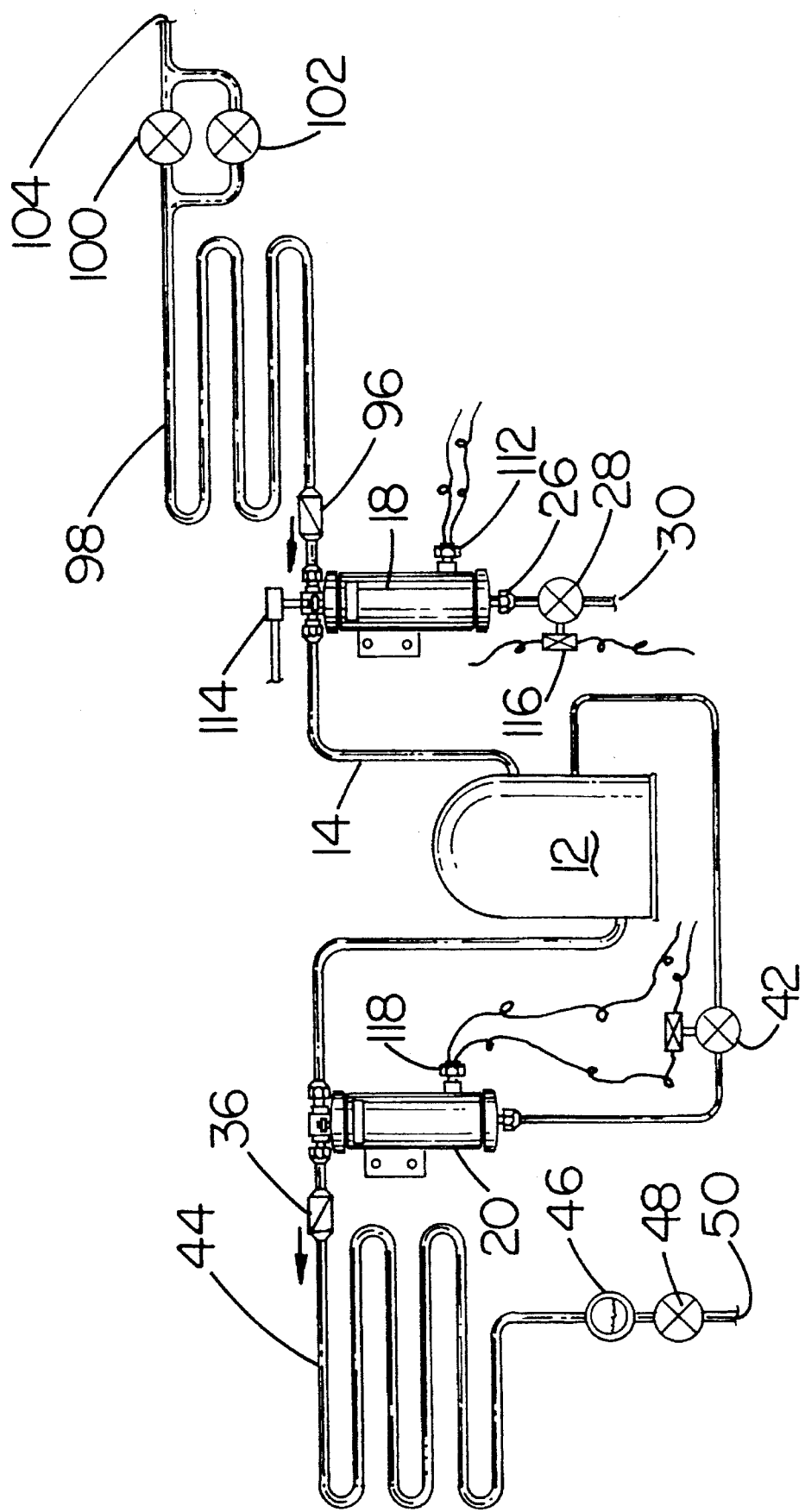
FIG. 8 is a third alternative embodiment of the recycling system of the present invention.

FIG. 8 shows yet another alternative embodiment of the system of the present invention. The alternative system shown in FIG. 8 is identical to the system shown in FIG. 6 except as noted.

As shown in FIG. 8 a first level detection sensor is mounted through the wall of first drier/separator 18. First sensor 112 is preferably a thermistor type level sensor of the type commercially available from Parker-Hannifin Corporation.

A vacuum sensor 114 is connected to the gage port 92 of drier/separator 18. A solenoid actuator 116 is attached to drain valve 28 to control the opening and closing thereof.

Sensor 112 and 114 are connected to electrical control circuitry that operates solenoid actuator 116. Actuator 116 is operated to open if the liquid level sensed by sensor 112 is high. However, if sensor 114 indicates a high vacuum in drier/separator 18, this is a sign that the drier/separator is plugged. In this event, valve 28 is not opened and electrical signal is generated by the control circuitry to stop compressor 12.

A second level detection sensor 118 is mounted in second drier/separator 20. Second sensor 118 is similar to sensor 112. Sensor 118 is connected to control circuitry that operates to open solenoid valve 42 when the oil level in drier/separator 20 reaches a predetermined level. Opening valve 42 drains drier/separator 20 and returns clean oil to compressor 12.

The alternative embodiment of the system shown in FIG. 8 is well adapted to be operated unattended for extended periods. This facilitates recycling large quantities of refrigerant and oil from high capacity refrigeration systems.

Thus the new refrigerant reclamation system of the present invention achieves the above stated objectives, eliminates difficulties encountered in the use of prior systems, solves problems and attains the desirable results described herein. In the foregoing description, certain terms have been used for brevity, clarity and understanding, however, no unnecessary limitations are to be implied therefrom because such terms are descriptive purposes and are intended to be broadly construed. Moreover, the descriptions and illustrations given are by way of examples and the invention is not limited to the exact details shown or described.

Having described the features, discoveries and principles of the invention, the manner in which it is utilized, and the advantages and useful results obtained; the new and useful structures, devices, elements, arrangements, parts, combinations, systems, equipment, operations, methods and relationships are set forth in the appended claims.

I claim:

1. A refrigerant recycling system, comprising:

recycling system inlet means for accepting refrigerant to be recycled mixed with a first compressor lubricant;

compressor means for compressing vaporized refrigerant, said compressor means having a compressor inlet and a compressor outlet, and wherein a second lubricant is delivered from said compressor outlet mixed with said refrigerant;

condenser means for condensing vaporized refrigerant to liquid, said condenser means having a condenser inlet in fluid communication with said compressor outlet, and a condenser outlet;

recycling system outlet means in fluid communication with said condenser outlet for delivering recycled refrigerant from said recycling system;

a first drier/separator having a first D/S inlet in fluid communication with said system inlet means, and a first D/S outlet in fluid communication with said compressor inlet;

said first drier/separator further comprising:

a first inlet conduit means in fluid communication with said first D/S inlet for conducting said refrigerant and first lubricant mixture to a lower portion of said first chamber;

first lubricant separating means in said lower portion of said first chamber for separating said first lubricant from said refrigerant, whereby said first lubricant is collected in said lower portion of said first chamber;

first drain means for enabling draining of said collected first lubricant from said lower portion of said first chamber; and first filter means located in said first chamber vertically above said lower portion of said first chamber for removing impurities from said refrigerant, said refrigerant passing through said first filter means from said lower portion of said first chamber to an outlet area of said first chamber, said first D/S outlet in fluid communication with said outlet area of said first chamber;

said system further comprising a second drier/separator having a second D/S inlet in fluid communication with said compressor outlet, and a second D/S outlet in fluid communication with said condenser inlet;

said second drier/separator further comprising:

a second body enclosing a second chamber;

a second inlet conduit means in fluid communication with said second D/S inlet for conducting said refrigerant and second lubricant mixture to a lower portion of said second chamber;

second lubricant separating means in said lower portion of said second chamber for separating said second lubricant from said refrigerant, whereby said second lubricant is collected in said lower portion of said second chamber;

second drain means for enabling draining of said collected second lubricant from said lower portion of said second chamber; and second filter means located in said second chamber vertically above said lower portion of said second chamber for removing impurities from said refrigerant, said refrigerant passing through said second filter means from said lower portion of said second chamber to an outlet area of said second chamber, said second D/S outlet in fluid communication with said outlet area of said second chamber.

2. The refrigeration recycling system according to claim 1 further comprising:

return means for returning said second lubricant from said second drain means to said compressor means.

3. The refrigerant recycling system according to claim 2 wherein said first separating means comprises a first separating chamber for quiescent separation of said first lubricant from said refrigerant.

4. The refrigerant recycling system according to claim 3 wherein said first filter means includes a first bed of molecular sieve material.

5. The refrigerant recycling system according to claim 4 wherein said filter means includes a first fine screen disposed intermediate of said first separating chamber and said first bed of molecular sieve material.

6. The refrigerant recycling system according to claim 5 wherein said first filter means further comprises a first pad of fibrous filter material disposed intermediate of said first bed and said outlet area of said first chamber.

7. The refrigerant recycling system according to claim 6 wherein said outlet area of said first chamber is a first upper area of said first chamber, said first upper area vertically above said first pad.

8. The refrigerant recycling system according to claim 7 wherein said second separating means comprises a second separating chamber for quiescent separation of said second lubricant from said refrigerant.

9. The refrigerant recycling system according to claim 8 wherein second filter means includes a second bed of molecular sieve material.

10. The refrigerant recycling system according to claim 9 wherein said second filter means includes a second fine screen disposed intermediate of said second separating chamber and said second bed of molecular sieve material.

11. The refrigerant recycling system according to claim 10 wherein said second filter means further comprises a second pad of fibrous filter material disposed intermediate of said second bed and said outlet area of said second chamber.

12. The refrigerant recycling system according to claim 11 wherein said outlet area of said second chamber is a second upper area of said second chamber said second upper area vertically above said second paid.

13. The refrigerant recycling system according to claim 12 wherein said first upper area is in fluid communication with a first pressure indicating means, whereby contamination of said first filter means is indicated.

14. The refrigerant recycling system according to claim 13 wherein said second upper area is in fluid communication with second pressure indicating means, whereby contamination of said second filter means is indicated.

15. A refrigerant recycling system comprising:

a recycling system inlet for accepting refrigerant to be recycled mixed with a compressor lubricant;

a compressor for compressing vaporized refrigerant, said compressor having a compressor inlet and a compressor outlet;

a condenser for condensing vaporized refrigerant to liquid, said condenser having a condenser inlet in fluid communication with said compressor outlet, and a condenser outlet;

a recycling system outlet in fluid communication with said condenser outlet for delivering recycled refrigerant from said recycling system;

a first drier/separator having a first D/S inlet in fluid communication with said system inlet, and a first D/S outlet in fluid communication with said compressor inlet;

a second drier/separator having a second D/S inlet in fluid communication with said compressor outlet, and a second D/S outlet in fluid communication with said condenser inlet;

each of said first and second drier/separators having a body enclosing a chamber;

an inlet conduit in communication with the respective D/S inlet for conducting mixed refrigerant and lubricant to a lower portion of said body chamber;

a lubricant separating chamber in the lower portion of said body chamber for separating lubricant from refrigerant, whereby lubricant is collected in the lubricant separating chamber;

a drain in said lubricant separating chamber for enabling draining of collected lubricant from said lubricant separating chamber; and filter material located in said body chamber vertically above said lubricant separating chamber for removing impurities from said refrigerant, said refrigerant passing through said filter material from said lower portion of said chamber to an outlet area of said chamber, the respective D/S outlet in fluid communication with said outlet area of said chamber.

16. The refrigerant recycling system according to claim 15 further comprising an evaporator for introducing heat for vaporizing said refrigerant, said evaporator positioned intermediate of and in fluid communication with said recycling system inlet and said compressor.

17. The refrigeration recycling system according to claim 16 further comprising an expansion device for expansion of the refrigerant, said expansion device positioned intermediate of and in fluid communication with said recycling system inlet and said evaporator.

18. The refrigeration recycling system according to claim 17 further comprising a bypass valve in a parallel fluid path with said expansion device.

19. A drier/separator for a refrigerant recycling system having a system inlet for accepting refrigerant to be recycled mixed with a compressor lubricant; and a compressor for compressing vaporized refrigerant, said compressor having a compressor inlet and a compressor outlet; a condenser for condensing vaporized refrigerant, said condenser having a condenser inlet in fluid communication with said compressor outlet, and a condenser outlet, and a recycling system outlet in fluid communication with said condenser outlet for delivering recycled refrigerant from said recycling system; said drier/separator comprising:

a body enclosing a chamber;

a D/S inlet in an upper portion of said chamber for providing fluid communication with said system inlet, and a D/S outlet for providing fluid communication with said compressor inlet;

an imperforate inlet conduit in fluid communication with said D/S inlet for conducting mixed refrigerant and lubricant directly to a lower portion of said chamber;

a lubricant separating chamber in said lower portion of said chamber for receiving said mixed refrigerant and lubricant directly from said inlet conduit and for separating said lubricant from said refrigerant, whereby said lubricant is collected in said lubricant separating chamber;

a drain in said lubricant separating chamber for enabling draining of said collected lubricant from said lower portion of said chamber; and filter media comprising molecular sieve material located in said chamber vertically above said lower portion of said chamber for removing water and particles from said refrigerant as said refrigerant passes upwardly through said filter media from said lower portion of said chamber to an outlet area in said upper portion of said chamber, said D/S outlet in fluid communication with said outlet area of said chamber.

20. The vapor drier/separator as in claim 19, wherein said upper and lower end caps are formed as separate pieces from the body.

21. The drier/separator as in claim 19, wherein said inlet conduit includes an increased diameter portion toward a lower distal end of the conduit in said lower portion of said chamber for decreasing the velocity of refrigerant flowing through the conduit.

22. The drier/separator as in claim 19, wherein said body comprises a cylindrical canister with upper and lower end caps, said lubricant separating chamber being defined by an inner surface of the canister and the lower end cap.

23. A vapor drier/separator for a refrigerant recycling system where refrigerant to be recycled is primarily in a vapor stage and is mixed with a compressor lubricant, said vapor drier/separator comprising:

a body having an upper end and a lower end, a first end cap on the upper end of the body with a fitting for connecting the vapor drier/separator within the refrigerant recycling system, a second end cap at the lower end of the body, and a drain in the second end cap, said fitting for said first end cap including an inlet opening and an outlet opening for directing the refrigerant into and out of the body;

an imperforate conduit extending downward from a first end at the inlet opening of the fitting to a second end toward the lower end of the body and into a first separating chamber; and filter material comprising molecular sieve material located within said body above said first separating chamber for removing water and particles from the refrigerant;

wherein the refrigerant to be recycled enters the vapor drier/separator through the inlet opening in the fitting, passes vertically downward toward the lower end of the body through the conduit into the first separating chamber where any lubricant in the refrigerant settles out of the refrigerant by quiescent action toward the lower end cap and can be periodically drawn off through the drain, and the vapor refrigerant then passes vertically upward through the filter material toward the upper end of the body to the outlet opening in the fitting.

24. The vapor drier/separator as in claim 23, further including a retaining assembly retaining said filter material within said body, said retaining assembly defining said first separating chamber toward the lower end of the body, and a second separating chamber toward the upper end of the body between said filter material and said outlet opening in the fitting.

25. The vapor drier/separator as in claim 24, wherein said retaining assembly comprises first and second perforated plates retained in the body and defining a filter chamber therebetween for the filter material, said first and second perforated plates each including an opening receiving said conduit.

26. The vapor drier/separator as in claim 25, wherein said first and second perforated plates each include a peripheral lip extending outwardly from the plates in close fitting relation to the body.

27. The vapor drier/separator as in claim 25, further including a screen located between one of said perforated plates and said filter material.

28. The vapor drier/separator as in claim 25, further including a fibrous pad located between at least one of said perforated plates and said filter material.

29. The vapor drier/separator as in claim 24, wherein said conduit includes an increased diameter portion toward the lower second end of the conduit for decreasing the velocity of refrigerant flowing through the conduit.

30. The vapor drier/separator as in claim 29, wherein said increased diameter portion of said conduit provides a widened nozzle opening and services as a locating and retaining fixture for said retaining assembly.

31. The vapor drier/separator as in claim 23, wherein an inner surface of said body and said second end cap define said first separating chamber.

32. A method for removing compressor lubricant, water and particles from vapor refrigerant in a refrigerant recycling system, comprising the steps of:

locating a vapor drier/separator in the refrigerant recycling system to receive the vapor refrigerant, said vapor drier/separator including a body having a top, a bottom, and an internal chamber, filter material for removing lubricant, water and particles located within said internal chamber, an imperforate conduit extending from the top of the body to a lower separation chamber at the bottom of the body, and a drain in the separation chamber;

directing the vapor refrigerant with compressor lubricant, water and particles into an inlet opening in the top of the vapor drier/separator body and vertically downward through the conduit toward the bottom of the body directly into the lower separation chamber; separating out by quiescent action the compressor lubricant from the vapor refrigerant in the separation chamber;

periodically draining the lubricant out of the separation chamber through the drain in the separation chamber;

directing the vapor refrigerant vertically upward through the filter material toward the top of the body and removing the water and particles from the vapor refrigerant, and directing the filtered vapor refrigerant through an outlet in the top of the vapor drier/separator body.

33. The method as in claim 32, wherein the refrigerant recycling system includes a compressor having a compressor inlet and a compressor outlet, and further including the step of locating the vapor drier/seperater in fluid communication with one of said compressor inlet or said compressor outlet.

34. The method as in claim 32, wherein said lower separating chamber is defined by an inner surface of said body and a bottom end cap on said body, and the vapor refrigerant with compressor lubricant, water and particles is directed through said conduit directly into the lower separating chamber.

35. The method as in claim 32, wherein the lubricant is drained out of the separating chamber concurrently with the vapor refrigerant being directed into the inlet opening at the top of the vapor drier/separator body.

* * * * *